United States Patent
Murata et al.

[11] Patent Number: 6,145,181
[45] Date of Patent: *Nov. 14, 2000

[54] METHOD FOR ASSEMBLING BALL JOINT FOR A WIPER LINK

[75] Inventors: Yukiho Murata; Takashi Ishii, both of Yokohama, Japan

[73] Assignee: Jidosha Denki Kogyo Kabushiki Kaisha, Kanagawa-Prefecture, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/979,558

[22] Filed: Nov. 26, 1997

[30] Foreign Application Priority Data

Dec. 10, 1996 [JP] Japan .................................. 8-329996

[51] Int. Cl.$^7$ ...................................... B23P 11/02
[52] U.S. Cl. ...................... 29/450; 29/898.043; 403/50; 403/133; 277/635
[58] Field of Search ............................ 29/441.2, 898.043, 29/506, 511, 523, 450, 235; 403/122, 133, 134, 50; 277/635

[56] References Cited

U.S. PATENT DOCUMENTS

| | | |
|---|---|---|
| 3,749,431 | 7/1973 | Schmid et al. . |
| 4,380,860 | 4/1983 | Riester et al. . |
| 4,552,480 | 11/1985 | McIntyre . |
| 4,896,988 | 1/1990 | Inoue ....................................... 403/134 |
| 4,902,157 | 2/1990 | Ishikawa et al. ......................... 403/50 |
| 5,009,538 | 4/1991 | Shirai et al. ............................ 403/134 |
| 5,011,321 | 4/1991 | Kidokoro ................................ 403/140 |
| 5,067,198 | 11/1991 | Ishikawa et al. . |
| 5,267,805 | 12/1993 | Ueno et al. ............................. 403/134 |
| 5,427,467 | 6/1995 | Sugiura .................................. 403/140 |
| 5,473,955 | 12/1995 | Stinson . |
| 5,601,378 | 2/1997 | Fukukawa et al. ...................... 403/140 |

FOREIGN PATENT DOCUMENTS

| | | | |
|---|---|---|---|
| 1525076 | 7/1969 | Germany ................................ 403/133 |

*Primary Examiner*—David P. Bryant
*Attorney, Agent, or Firm*—Sughrue, Mion, Zinn, Macpeak & Seas, PLLC

[57] ABSTRACT

A ball joint, which is composed of a ball pin, a retainer connected with the ball pin and an elastic joint seal having first and second apertures for covering the ball pin and the retainer. The ball joint is assembled very easily by pressing the ball pin against the second aperture of the joint seal which has been previously set on the retainer, at a predetermined relative speed higher than 20 cm/s after applying lubricant on the inner peripheral face of the second aperture of the joint seal.

6 Claims, 8 Drawing Sheets

METHOD FOR ASSEMBLING BALL JOINT FOR A WIPER LINK

BACKGROUND OF THE INVENTION

1. Field of the Invention

This invention relates to a ball joint used for connecting, for example, a link connecting rod and a motor arm or a pivot arm in a wiper link mechanism for converting turning force of a wiper motor into oscillating movement of a wiper blade, and a method for assembling a ball joint of this kind.

2. Description of the Prior Art

Among the aforementioned ball joints applied to the wiper link mechanism for converting the rotation of the wiper motor into the reciprocative oscillatory motion of the wiper blade, a ball joint is known which is provided with a ball pin fixed to one end of the motor arm secured to a motor shaft of the wiper motor, and a retainer fixed to one end of the link connecting rod and connected with the ball pin through a spherical pair. Furthermore, a ball joint is known which is provided with retainer fixed to the opposite end of the link connecting rod and, a ball pin fixed to a free end of the pivot arm secured to a pivot shaft and connected with the retainer through a spherical pair.

In the aforementioned ball joints, a joint seal made of rubber further disposed between retainer and ball pin for covering the retainer and the ball pin and making the ball joint waterproof because the link mechanism is installed in a position where rain-water or washing water easily splashes. The joint seal is formed in a bottomless sack-like shape having a first aperture to be fitted to the retainer at one end and a second aperture to be fitted to a stem or shank of the ball pin at the opposite end.

In the setting up of the joint seal on the retainer and the ball pin, it is necessary to tightly fit the second aperture of the joint seal on the shank after passing a spherical portion of the ball pin having a diameter larger than that of the shank through the second aperture by enlarging the second aperture, therefore it is not possible to set up the joint seal at the same time of connecting the ball pin with the retainer.

Accordingly, it is necessary to set the second aperture of the joint seal to the shank of the ball pin in advance to the connection of the ball pin and the retainer in order to assemble the ball joint having the aforementioned structure. Also, it is necessary to set the first aperture of the joint seal to the retainer after connecting the ball pin with the retainer, so that there is a problem in that it is not possible to improve efficiency in the manufacturing process of the ball joint.

SUMMARY OF THE INVENTION

It is an object of the Invention to solve the aforementioned problem and to provide a ball joint which is possible to be easily assembled by setting up the joint seal at the same time of connecting the ball pin and the retainer, and a method for assembling a ball joint of this kind under the improved productivity.

The ball joint according to this invention for accomplishing the aforementioned object is characterized by consisting of a retainer formed in a cap-like shape having an airtight spherical hollow; a ball pin provided with a cylindrical shank and a spherical ball to be inserted into the spherical hollow of the retainer and connected with the retainer through a spherical pair, and an elastic joint seal provided with a first aperture to be fitted to the retainer at one end and a second aperture to be fitted to the cylindrical shank of the ball pin at an opposite end thereof for covering between retainer and ball pin; the retainer being provided with a seal fitting portion to be fitted with the first aperture of the joint seal surrounding an opening communicating with the spherical hollow and a brim to prevent the joint seal from disconnection on a free end of the seal fitting portion; the joint seal being further provided with a barrel portion having a semicircularly curved section expending outwardly on a side of the first aperture and a stepped portion continuous to the barrel portion on a side of the second aperture and having an S-shaped section.

In an embodiment of the ball joint according to this invention, it is preferable to form the ball pin so that out side diameter of the spherical ball may be 1.5 to 1.7 times larger than an inside diameter of the second aperture and outer diameter of the cylindrical shank may be 1.1 to 1.3 times larger than the inside diameter of the second aperture of the joint seal.

The method for assembling a ball joint according to another aspect of this invention is characterized in that the ball joint is composed of a retainer formed in a cup-like shape having an airtight spherical hollow, a ball pin having a cylindrical shank and a spherical ball connected with the retainer through a spherical pair and an elastic joint seal having a first and a second aperture at both ends thereof for covering between retainer and ball pin, the method comprises the steps of fitting the first aperture of the joint seal to a seal fitting portion surrounding an opening communicating with the spherical hollow of the retainer, applying a lubricant to the second aperture at an opposite end of the joint seal or the spherical ball of the ball pin, arranging the ball pin and the retainer fitted with the joint seal so as to direct the spherical ball of the ball pin toward the opening of the retainer and coincide axes of the ball pin and the retainer with each other, and pressing the ball pin and the retainer relatively at predetermined relative speed higher than 20 cm/s, thereby inserting the spherical ball of the ball pin into the spherical hollow of the retainer through the second aperture of the joint seal and fitting the second aperture of the joint seal to the cylindrical shank of the ball pin.

In an embodiment of the method for assembling a ball joint according to this invention, the joint seal may be further provided with a barrel portion having a semicircularly curved section expanding outwardly on a side of the first aperture and a stepped portion continuous to the barrel portion on a side of the second aperture and having an S-shaped section. In another embodiment of the method for assembling a ball joint according to this invention, the ball pin may be formed so that outside diameters of the spherical ball and the cylindrical shank may be 1.5 to 1.7 times and 1.1 to 1.3 times larger than an inside diameter of the second aperture of the joint seal.

The ball joint according to this invention is composed of the retainer having the spherical hollow, the ball pin connected to the retainer through the spherical pair, and the elastic joint seal for covering the retainer and the ball pin. In a case of connecting the ball pin with the retainer fitted with the first aperture of the joint seal to the seal fitting portion surrounding the opening of the retainer, the spherical ball of the ball pin comes in touch with the second aperture on the opposite end of the joint seal in advance to the insertion of the spherical ball into the spherical hollow of the retainer.

In this time, a periphery of the second aperture is tucked on the inner side of the joint seal and the spherical ball of the ball pin is impossible to be passed through the second aperture of the joint seal when the ball pin is pressed against the joint seal and the retainer at a comparatively low relative speed. However, if the ball pin is pressed against the joint seal at a relative speed higher than a predetermined speed, air enclosed in the joint seal and the spherical hollow of the retainer and pressed by the spherical ball of the ball pin acts on an inner face of the joint seal, whereby the joint seal is inflated laterally, the periphery of the second aperture is prevented to be tucked in and the second aperture of the joint seal is enlarged elastically. Therefore, the spherical ball of the ball pin is passed speedily through the second aperture enlarged by the air and inserted into the spherical hollow of the retainer successively, that is the joint seal is set up easily on the retainer and the ball pin at the same time of connecting the ball pin with the retainer.

In the ball joint according to this invention, the joint seal is formed with the stepped portion having the S-shaped section on the side of the second aperture thereof. Therefore, the periphery of the second aperture becomes more difficult to be tucked on the inner side of the joint seal and the second aperture of the joint seal is enlarged more easily by the air pressure applied on the stepped portion.

In the ball joint according to a preferred embodiment of this invention, the ball pin is provided with the spherical ball of which outside diameter is 1.5 to 1.7 times larger than the inside diameter of the second aperture of the joint seal and the cylindrical shank of which outside diameter is 1.1 to 1.3 times larger than the inside diameter of the second aperture of the joint seal, so that the second aperture of the joint seal is fitted more tightly to the cylindrical shank of the ball pin after passing smoothly through the spherical ball of the ball pin by pressing the ball pin against the retainer at a relative speed higher than the predetermined speed.

In the method for assembling the ball joint according to another aspect of this invention, the ball pin, for example, is pressed against the retainer fitted with the first aperture of the joint seal at the predetermined relative speed higher than 20 cm/s after applying the lubricant to the second aperture of the joint seal or the spherical ball of the ball pin. Accordingly, air enclosed in the joint seal and the spherical hollow of the retainer acts on the inner face of the joint seal to inflate the joint seal at the time of being exhausted through a clearance formed between the spherical ball of the ball pin and the second aperture of the joint seal owing to the pressure caused by the spherical ball of the ball pin, whereby the periphery of the second aperture is prevented to be tucked on the inside of the joint seal and the second aperture of the joint seal is enlarged elastically.

Consequently, the spherical ball of the ball pin is passed speedily through the second aperture of the joint seal while the second aperture is enlarged by passage of the air, so that the joint seal is set up easily on the retainer and the ball pin at the same time of the connection of the ball pin with the retainer.

In this time, if the ball pin is pressed against the joint seal at a relative speed not higher than 20 cm/s, it is not possible to pass a large volume of the air in a time between the spherical ball of the ball pin and the second aperture, so that the second aperture of the joint seal is not enlarged sufficiently and the periphery of the second aperture is tucked on the inside of the joint seal, therefore it is impossible to pass the spherical ball of the ball pin into the second aperture of the joint seal.

Furthermore, it is preferable to select the relative speed of approximately 30 cm/s for pressing the ball pin and the retainer in this invention.

In the assembling method according to a preferred embodiment of this invention, the joint seal formed with the stepped portion on the side of the second aperture is used. Therefore, the air pressure acts on the stepped portion of the joint seal, the second aperture of the joint seal becomes more easy to be enlarged and the ball joint is assembled more easily. Furthermore, in the assembling method according to another embodiment of this invention, the ball pin is used, which is provided with the spherical ball of which outside diameter is 1.5 to 1.7 times larger than the inside diameter of the second aperture and the cylindrical shank of which outside diameter is 1.1 to 1.3 times larger than the inside diameter of the second aperture of the joint seal. Accordingly, the second aperture of the joint seal is fitted more tightly to the cylindrical shank of the ball pin after passing more smoothly through the spherical ball of the ball pin and the ball joint excellent in the watertightness is assembled more easily.

DESCRIPTION OF THE PREFERRED EMBODIMENT

Figure 1:
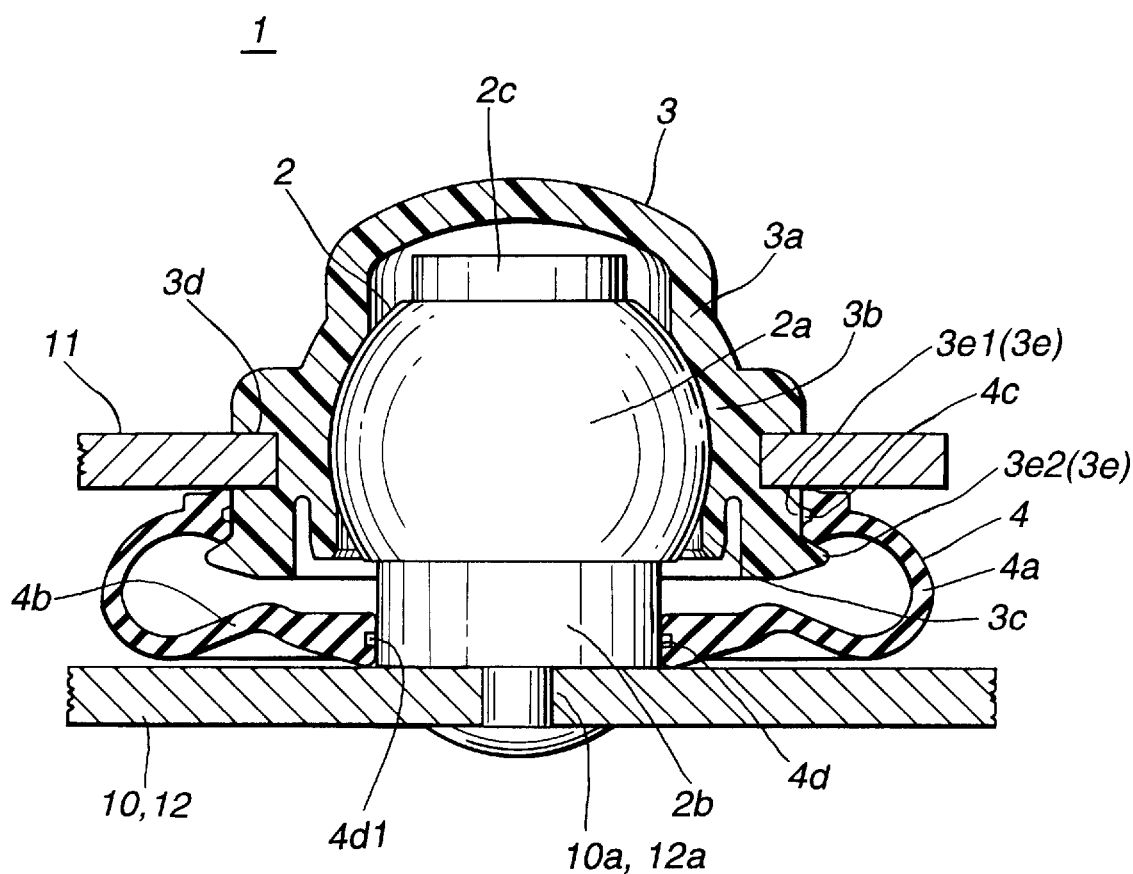
FIG. 1 is a sectional view illustrating a ball joint according to an embodiment of this invention.

An embodiment of the ball joint according to this invention will be described below, together with the assembling method of the ball joint with reference to FIG. 1 through FIG. 8.

This ball joint 1 is composed of a ball pin 2 having a spherical ball 2a and a cylindrical shank 2b, a retainer 3 having a spherical hollow 3b and connected with the ball pin 2 through a spherical pair, and a joint seal 4 attached between the ball pin 2 and the retainer 3.

Figure 2:
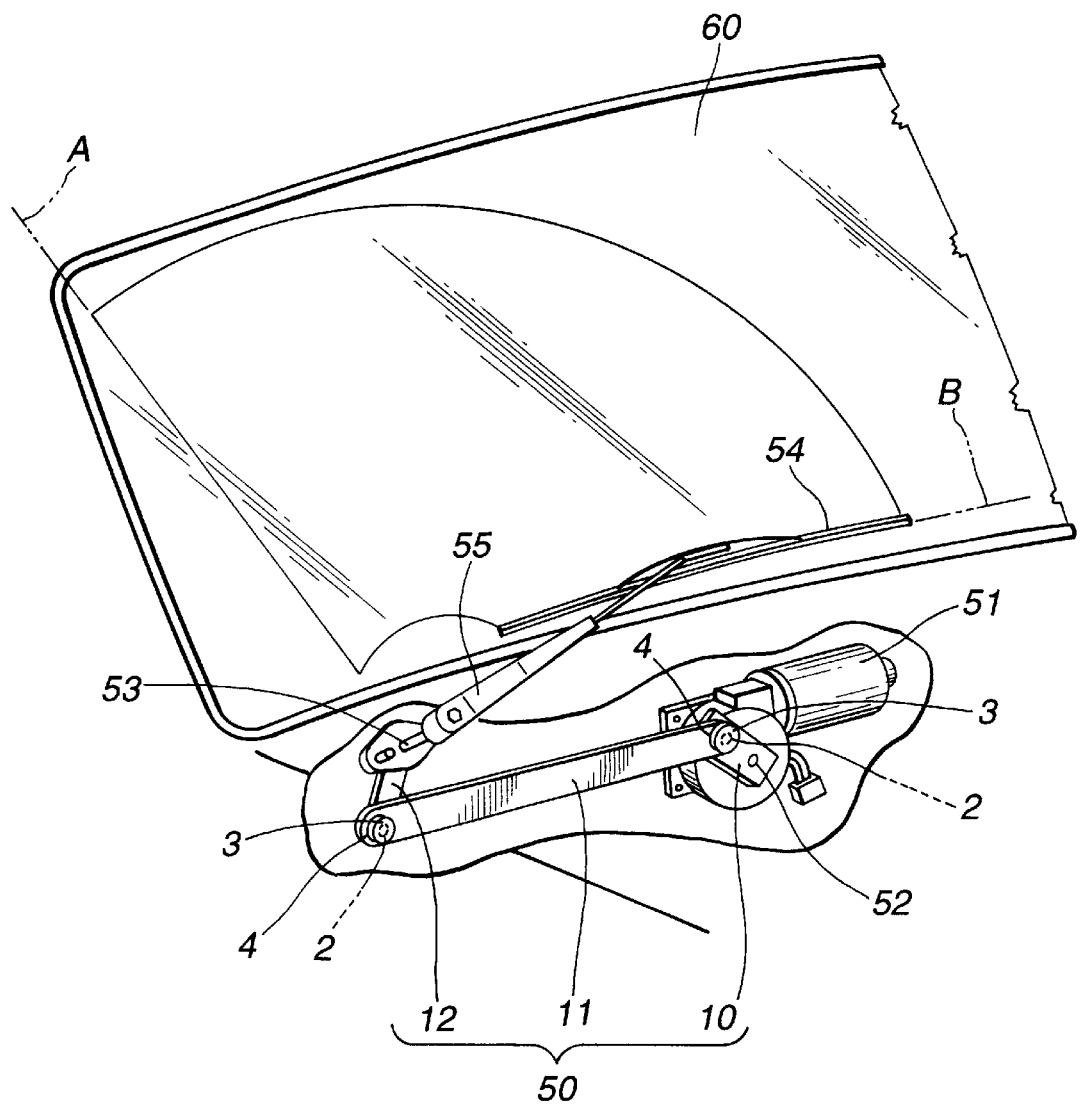
FIG. 2 is a perspective view illustrating a wiper link mechanism applied with the ball joint shown in FIG. 1.

The ball pin 1 is applied, for example, to a wiper link mechanism 50 shown in FIG. 2. The wiper link mechanism 50 is provided with a motor arm 10 connected to a motor shaft 52 of a wiper motor 51, a pivot arm 12 connected to a pivot shaft 53 and a link connected rod 11 connecting between the motor arm 10 and the pivot arm 12. The motor arm 10 and the pivot arm 12 are fixed with the ball pins 2 and 2, and the link connecting rod 11 is fixed with the retainers 3 and 3 at both ends, respectively. The ball pins 2 and 2 fixed to the motor arm 10 and the pivot arm 12 are fitted rotatably into the respective retainers 3 and 3. The retainer 3 and the ball pin 2 fitted into the retainer 3 are set with the joint seal 4. The pivot shaft 53 of the wiper link mechanism 50 is connected with a wiper arm 55 attached with a wiper blade 54 on the outside of the vehicle body.

Figure 5:
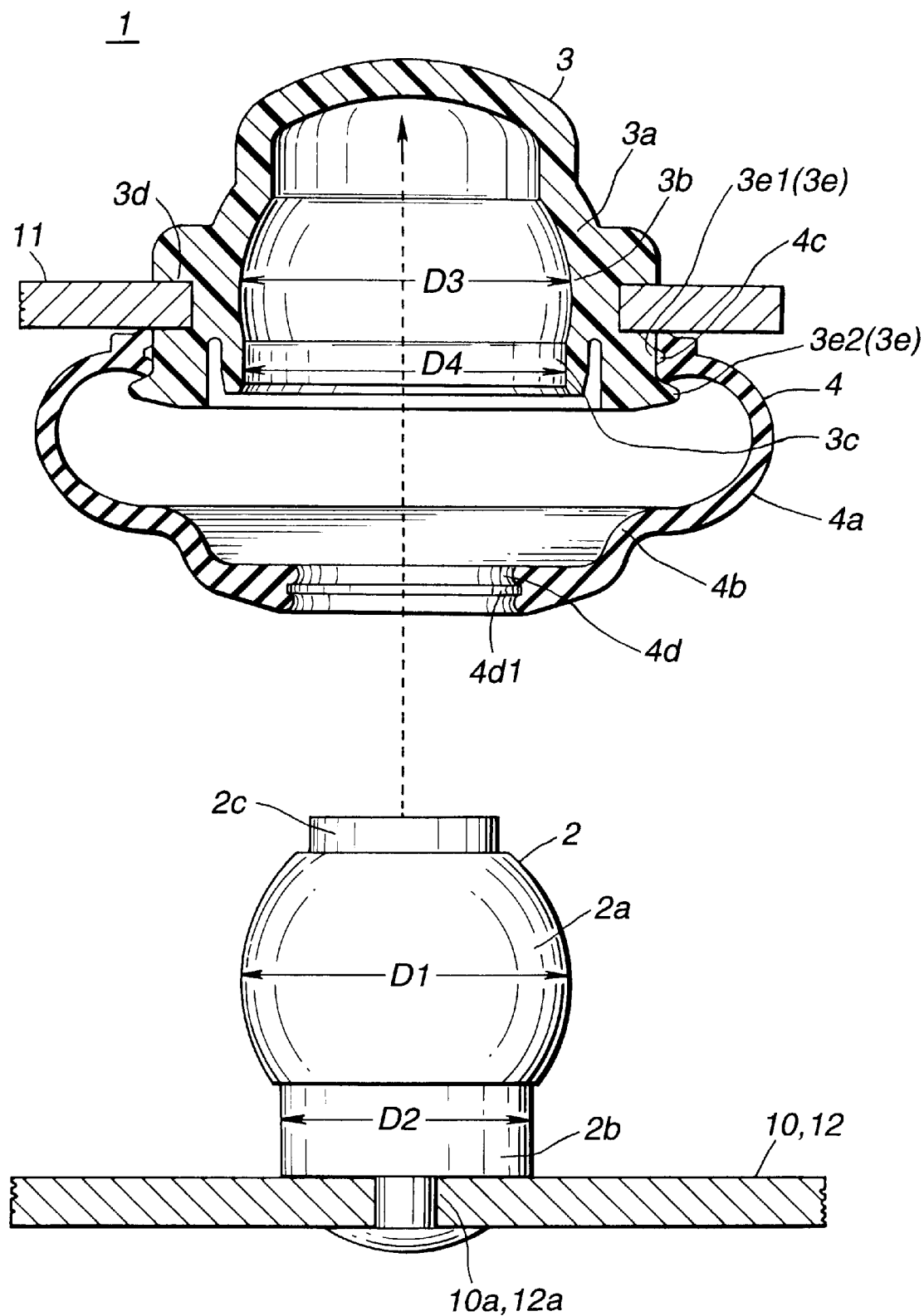

The ball pin 2 is provided with the spherical ball 2a formed in a spherical shape and the cylindrical shank 2b formed in a cylindrical shape on the lower side of the spherical ball 2a as shown also in FIG. 5, further formed with a positioning projection 2c on the upper side of the spherical ball 2a. The spherical ball 2a of the ball pin 2 has an outside diameter D1 and the cylindrical shank 2b has an outside diameter D2.

The ball pin 2 is fixed to a setting hole 10a or 12a formed at an end of the motor arm 10 or the pivot arm 12 by caulking at the lower side of the cylindrical shank 2b.

Figure 3:
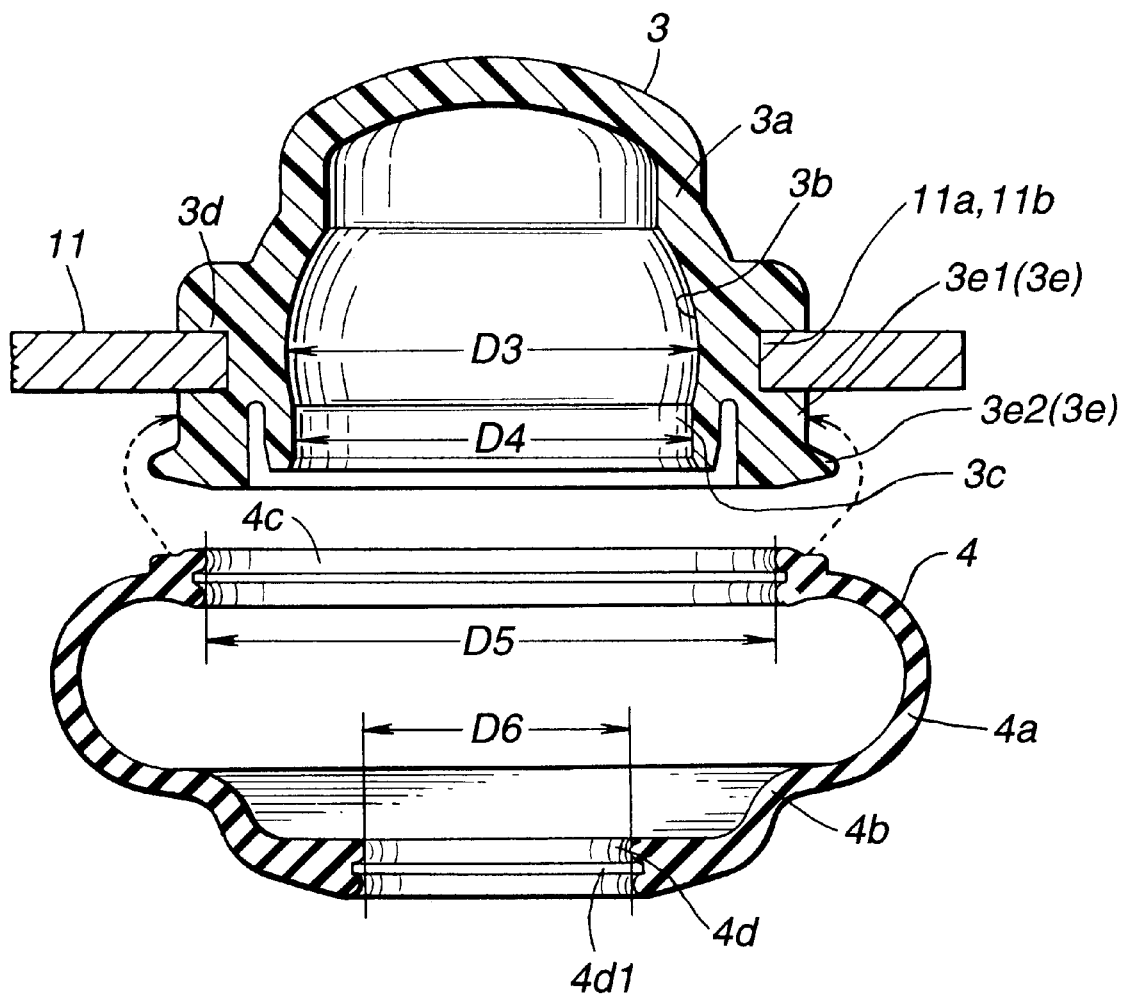
FIG. 3 to FIG. 7 are sectional views illustrating an assembling process of the ball joint shown in FIG. 1 in order.

The retainer 3 is formed with a spherical hollow 3b on the inside of a retainer body 3a formed in a cap-like shape as shown in FIG. 3, for example. The spherical hollow 3b has airtightness and an inside diameter D3 slightly larger than the outside diameter D1 of the spherical ball 2a of the ball pin 2. Furthermore, the retainer 3 is formed with an opening 3c communicating with the spherical hollow 3b for receiving the spherical ball 2a. The opening 3c has a inside diameter D4 slightly smaller than the outside diameter D1 of the spherical ball 2a of the ball pin 2, and a peripheral part of the opening 3c is deformable elastically toward the outside.

The retainer 3 is secured to a fixing part 11a or 11b formed in respective ends of the link connecting rod 11 at an arm fixing groove 3d formed on the outer periphery of the retainer body 3a.

The retainer 3 is further provided with a seal fitting portion 3e surrounding the opening 3c on the lower side of the arm fixing groove 3d in order to be fitted with an aperture 4c formed at one end (the upper end in figures) of the joint seal 4 described later. The seal fitting portion 3e is composed of a fitting face 3e1 formed over the whole circumference of the retainer body 3a and a brim 3e2 projecting outwardly from the whole circumference of the retainer body at the free end of the seal fitting portion 3e so as to prevent the joint seal 4 from disconnection.

The joint seal 4 is formed of rubber-like substance into a bottomless sack-like shape, and provided with a barrel portion 4a having a semicircularly curved section expanding outwardly and a stepped portion 4b having an S-shaped section in one continuous body as shown in FIG. 3. The stepped portion 4b of the joint seal 4 is effective to facilitate enlargement of the second aperture 4d at the time of passing the spherical ball 2a of the ball pin 2 through the second aperture 4d of the joint seal 4 as described later. The joint seal 4 is further formed with a first aperture 4c to be fitted to the seal fitting portion 3e of the retainer 3 at the end on the side of the barrel portion 4a (on the upper side in the figures) and a second aperture 4d to be fitted to the cylindrical shank 2b of the ball pin 2 at the end on the side of the stepped portion 4b (on the lower side in the figures). The second aperture 4d is formed with an oil groove 4d1 on an inner peripheral face thereof. The second aperture 4d is applied with lubricant such as oil, grease or the like on the inner peripheral, surface so that the applied lubricant is charged in the oil groove 4d1.

The first aperture 4c of the joint seal 4 has an inside diameter D5 and the second aperture 4d has an inside diameter D6 in a state before installation onto the retainer 3 and the ball pin 2 as shown in FIG. 3.

The first aperture 4c of the joint seal 4 has the inside diameter D5 smaller than outside diameters of the fitting face 3e1 and the brim 3e2 of the seal fitting portion 3e formed on the outer periphery of the retainer 3 in the state before the installation of the joint seal 4, and is so designed as to be fitted on the fitting face 3e1 after passing over the brim 3e2. Accordingly the joint seal 4 is connected to the retainer 3 by its own elasticity so as not to be removed from the seal fitting portion 3e of the retainer 3.

In this embodiment, the aforementioned outside diameter D1 of the spherical ball 2a of the ball pin 2 is selected so as to show a value 1.6 times as much as the inside diameter D6 of the second aperture 4d of the joint seal 4, and the outside diameter D2 of the cylindrical shank 2b of the ball pin 2 is selected so as to show a value 1.2 times much as much as the inside diameter D6 of the second aperture 4d.

The ball joint 1 having the aforementioned structure is assembled through the process shown in FIG. 3 to FIG. 7.

First of all, the joint seal 4 is attached to the retainer 3 secured to the fixing part 11a or 11b of the link connecting rod 11 at the arm fixing groove 3d by fitting the first aperture 4c of the joint seal 4 on the fitting face 3e1 of the seal fitting portion 3e formed on the outer periphery of the retainer 3 after passing over the brim 3e2 of the seal fitting portion 3e as shown in FIG. 3. The joint seal 4 is so designed as not to be disconnected from the seal fitting portion 3e by the working of the brim 3e2.

Figure 4:
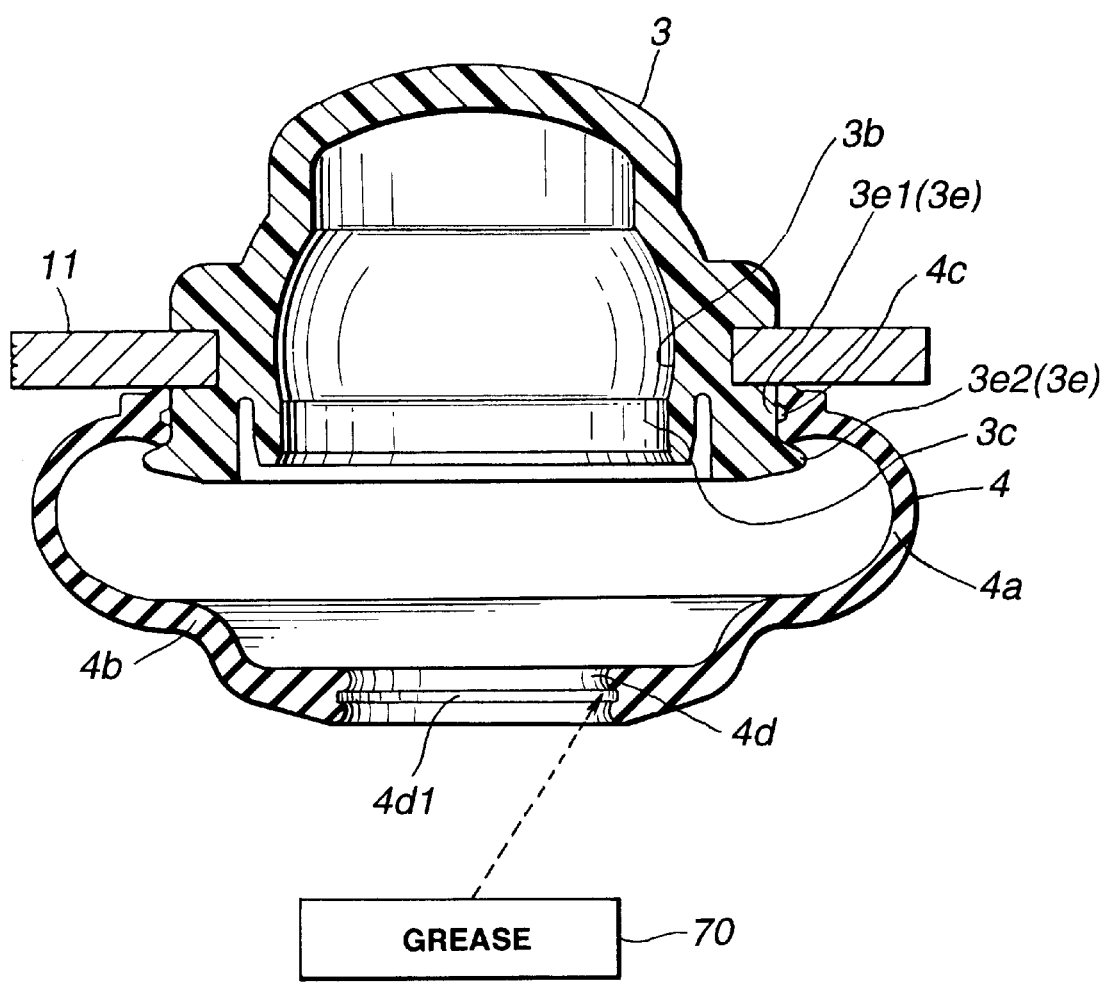

After the setting of the joint seal 4, the joint seal 4 connected to the retainer 3 at the first aperture 4c is applied with grease 70 as lubricant on the inner peripheral face of the second aperture 4d, whereby the grease is charged in the oil groove 4d1 as shown in FIG. 4. At this time, the grease 70 may be applied on a surface of the spherical ball 2a of the ball pin 2.

Next, the ball pin 2 fixed to the setting hole 10a or 12a of the motor arm 10 or the pivot arm 12 at the cylindrical shank 2b is positioned on the lower side of the retainer 3 so as to oppose the spherical ball 2a to the second aperture 4d of the joint seal 4 as shown in FIG. 5. In this step of the assembling process, alignment of axes of the joint seal 4 (or the retainer 3) and the ball pin 2 is carried out by positioning the positioning projection 2c formed on the top end of the spherical ball 2a of the ball into aperture 4d of joint seal 4.

Figure 8:
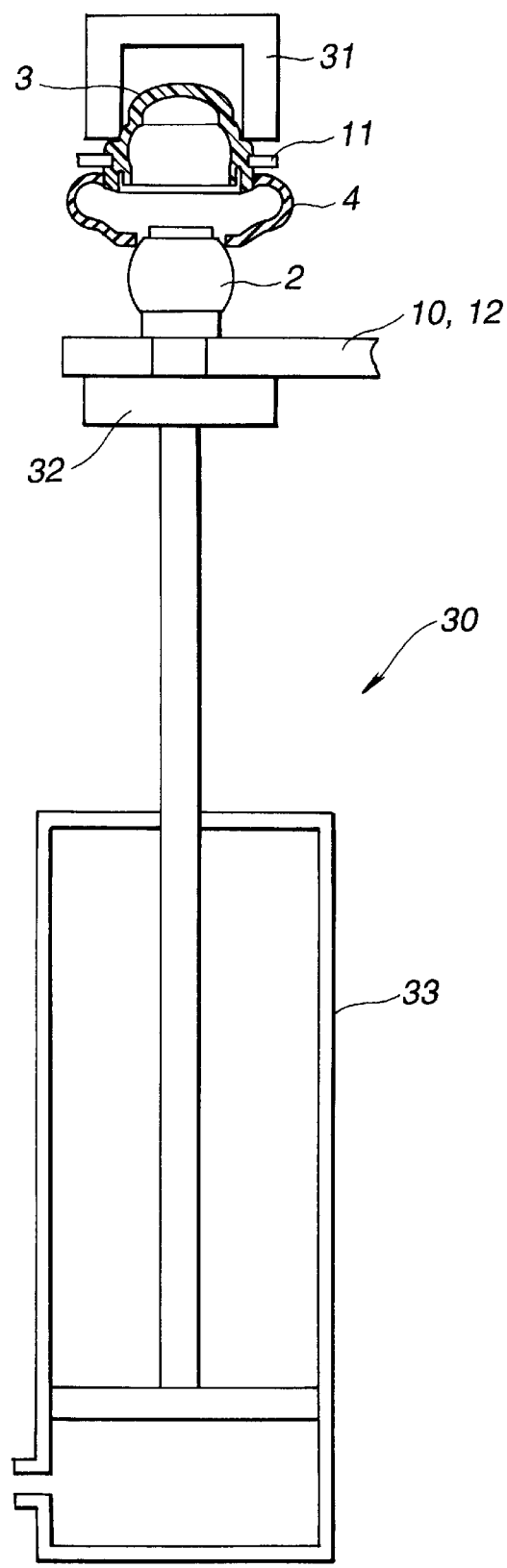
FIG. 8 is a schematic illustration of an example of the assembling jig used for the method according this invention.

At this time, an assembling jig 30 as shown in FIG. 8 may by used, which is provided with an upper holder 31 and a lower holder 32 driven in the upward and downward directions against the upper holder 31 by a pressing device such as a hydraulic cylinder 33. Namely, the motor arm 10 or the pivot arm 12 secured with the ball pin 2 is held by the lower holder 32 and the link connecting rod 11 secured with the retainer 3 is held by the upper holder 31 in a state the axes of the spherical ball 2a of the ball pin 2 and the spherical hollow 3b of the retainer 3 are aligned with each other.

Figure 6:
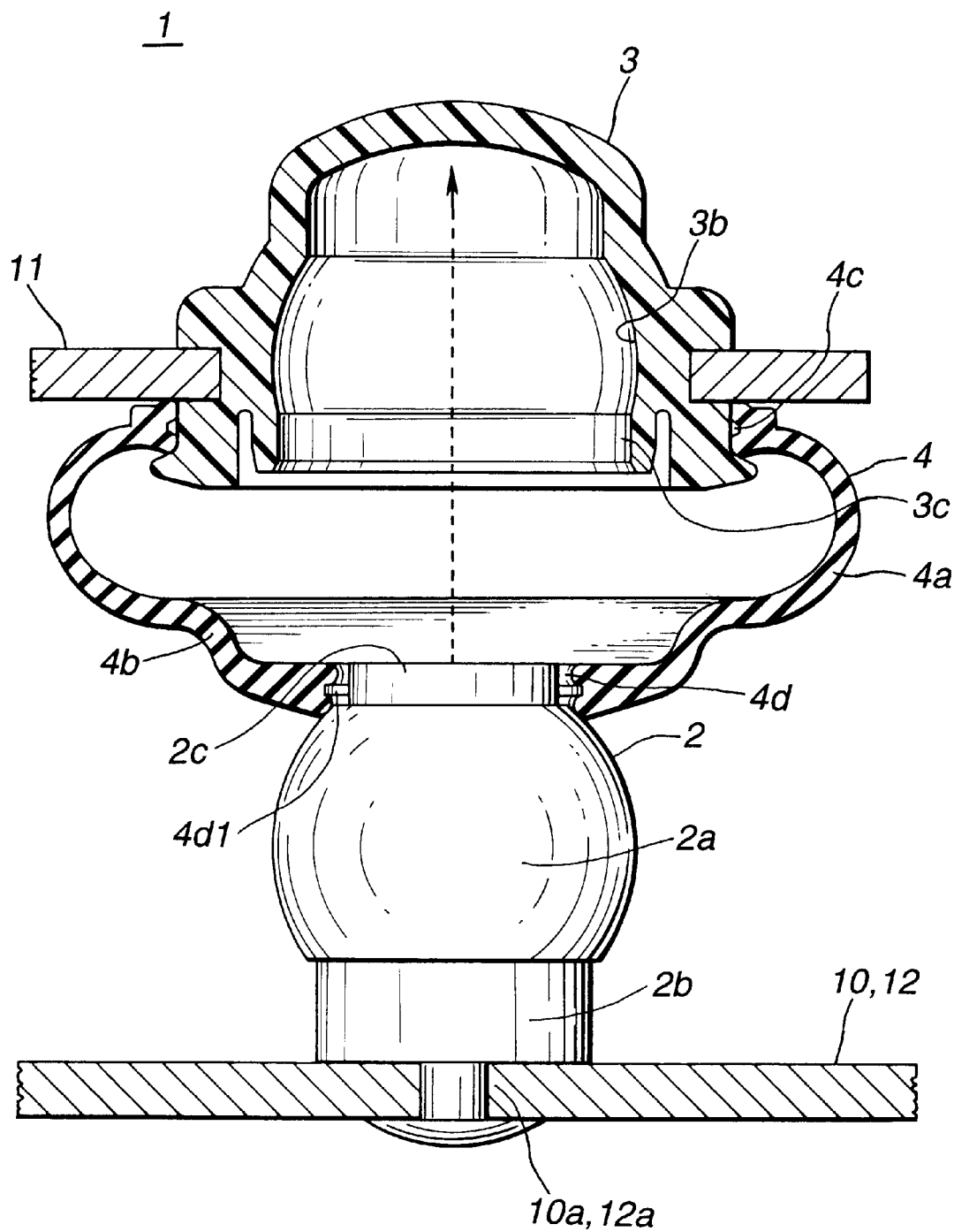

In this state, the lower holder 32 of the assembling jig 30 holding the motor arm 10 or the pivot arm 12 secured with the ball pin 2 starts to rise against the upper holder 31 holding link connecting rod 11 secured with the retainer 3 and the spherical ball 2a of the ball pin 2 comes in touch with the second aperture 4d of the joint seal 4 as shown in FIG. 6. Hereby, the second aperture 4d comes in touch with the spherical ball 2a through the grease 70 charged in the oil groove 4d1 of the second aperture 4d and air in the joint seal 4 and the spherical hollow 3b of the retainer 3 is isolated from the outside.

Figure 7:
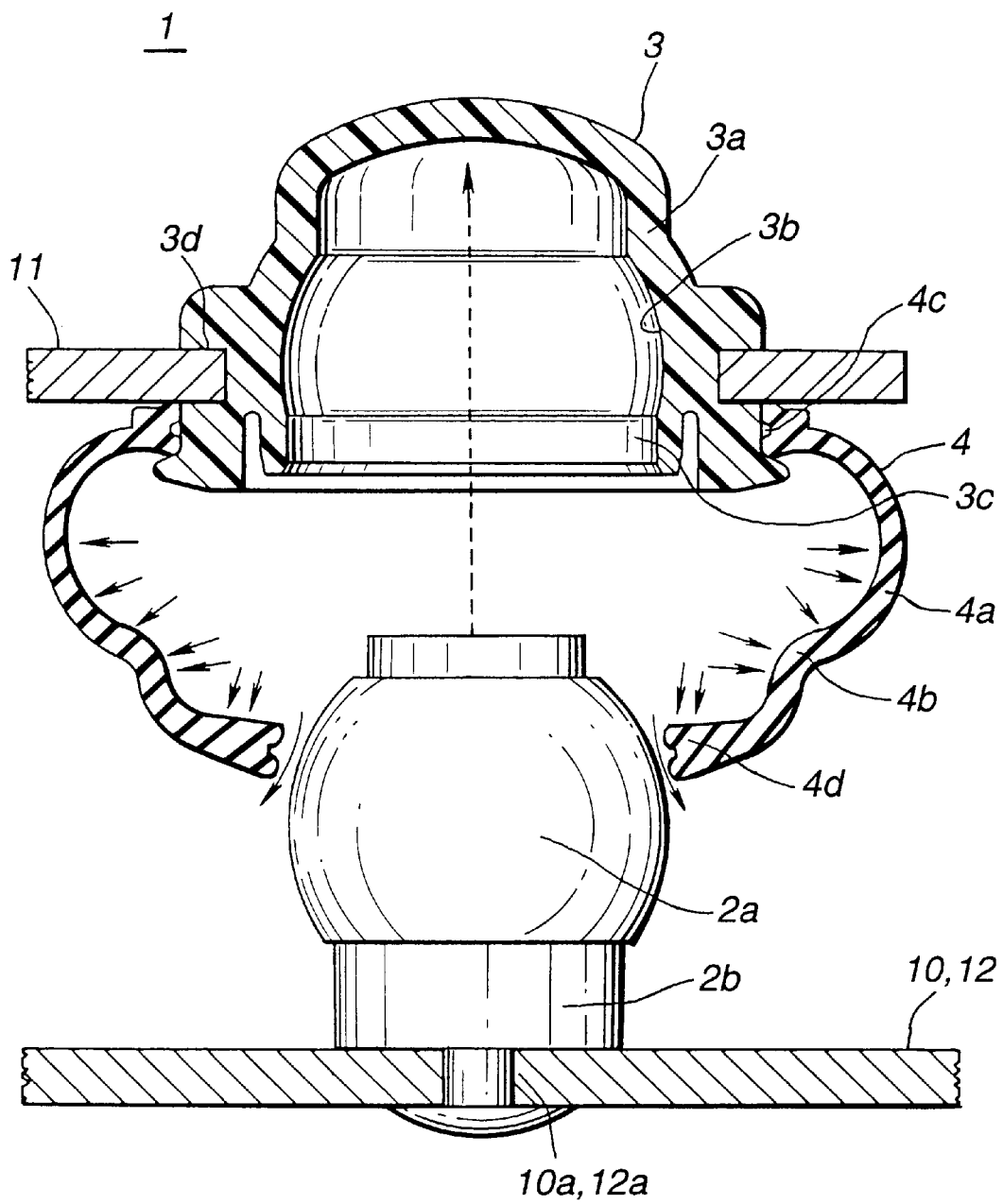

The internal pressure of the air enclosed in the joint seal 4 and the spherical hollow 3b of the retainer 3 becomes higher by the compression caused by further ascention of the ball pin 2 together with the lower holder 32 of the assembling jig 30, and the air pressure is applied on the inner face of the joint seal 4 as shown with arrows in FIG. 7, whereby the joint seal 4 is deformed elastically and inflated outwardly.

In this time, when the ball pin 2 is pressed against the retainer 3 and the joint seal 4 at a predetermined speed higher than 20 cm/s, that is 30 cm/s for example, the second aperture 4d is enlarged by the air exhausted all at once through a clearance formed between the second aperture 4d and the spherical ball 2a of the ball pin 2 without tucking of the periphery of the second aperture 4d. Accordingly, the spherical ball 2a of the ball pin 2a can get into the joint seal 4 speedily through the second aperture 4d while the second aperture 4d is enlarged by the passage of the air. In the pressing of the ball pin 2, the stepped portion 4b of the joint seal 4 is effective to enlarge the second aperture 4d because the air pressure is applied on the stepped portion 4b in the lateral direction.

Successively, the spherical ball 2a of the ball pin 2 is fitted into the spherical hollow 3b of the retainer 3 under pressure by elastically deforming the peripheral part of the opening 3c of the retainer 3.

In this manner, the ball pin 2 is connected rotatably to the retainer 3 through the spherical pair, and the joint seal 4 is set up between the retainer 3 and the ball pin 2 at the same time, that is the ball joint 1 shown in FIG. 1 can be assembled very easily through the assembling method according to this invention. The second aperture 4d is fitted on the outer periphery of the cylindrical shank 2b tightly through the grease 70 charged in the oil groove 4d1 on the inner peripheral face of the aperture 4d, thereby preventing penetration of water, (lust and the like into the spherical hollow 3b of the retainer 3.

In the assembling method according to this invention, it is also possible to press the retainer 3 against the ball pin 2 in a stationary state on the contrary to the above-mentioned embodiment, and further possible to press retainer 3 and the ball pin 2 in the closing direction at the same time. Furthermore, the assembling may be also carried out by hand without using the assembling jig 30 as mentioned above so long as the ball pin 2 and the retainer 3 are pressed with each other at a predetermined relative speed higher than 20 cm/s.

In the wiper link mechanism 50 shown in FIG. 2, which is provided with the motor arm 10, the link connecting rod 11 and the pivot arm 12 connected through the above-mentioned ball joint 1, when the motor shaft 52 of the wiper motor 51 starts to rotate according to power supplied to the wiper motor 51, the rotation of the motor shaft 52 is converted into reciprocating motion of the link connecting rod 11 through the motor arm 10 connected to the motor shaft 52, and the reciprocating motion of the link connecting rod 11 is converted into reciprocating rotation of the pivot shaft 53 through the pivot arm 12 connected to the pivot shaft 53, whereby the wiper blade 54 connected to the pivot shaft 53 through the wiper arm 55 wipes windshield 60 by oscillating between the upper turning point A and the lower turning point B on the windshield 60.

As mentioned above, the ball joint according to this invention is composed of the retainer, the ball pin connected with the retainer through the spherical pair and the elastic joint seal having the first and the second apertures and the stepped portion on the side of the second aperture to be fitted to the ball pin. Therefore, it is possible to pass the ball pin through the second aperture enlarged by the passage of air by pressing the ball pin against the joint seal and the retainer at a relative speed higher than a predetermined value and possible to set up the joint seal on the ball pin and the retainer at the same time of the connection between ball pin and retainer, so that an excellent effect can be obtained in that it is possible to assemble the ball joint very easily.

In the method for assembling the ball joint according to another aspect of this invention, the ball pin and the retainer previously set with the joint seal are pressed with each other at the predetermined relative speed higher than 20 cm/s after applying the lubricant to the second aperture of the joint seal or the spherical ball of the ball pin. Therefore, the second aperture is enlarged by the passage of air at the time of passing the ball pin through the second aperture, and it is possible to pass the second aperture of the joint seal and possible to set up the joint seal on the ball pin and the retainer at the same time of the connection between ball pin and retainer, whereby an excellent effect can be obtained in that it is possible to assemble the ball joint very easily and possible to improve the productivity of the ball joint of this kind.

What is claimed is:

1. A method for assembling a ball joint for use in a wiper link including a driving arm and a connecting rod for a motor vehicle windshield wiper, said ball joint being composed of a ball pin connected to the driving arm of said wiper link, a retainer attached with the connecting rod of said wiper link, and a joint seal member being of an elastic material and formed into a barrel shape, said ball pin being provided with
  a spherical ball portion with an outer diameter of $D_1$ and
  a cylindrical shank portion monolithic with the spherical ball portion and connected with the driving arm of said wiper link, said cylindrical shank portion having an outer diameter $D_2$ which is smaller than the outer diameter $D_1$ of the spherical ball portion, said retainer being cap-shaped and having
  an airtight spherical hollow portion with an inner diameter of $D_3$ slightly larger than the diameter $D_1$ of said spherical ball portion of said ball pin,
  an opening portion being elastically deformable with an inner diameter of $D_4$ slightly smaller than the diameter $D_1$ of said spherical ball portion of said ball pin, and
  a seal fitting portion with a brim portion surrounding the opening portion, and, said joint seal member having
  a first aperture portion with an inner diameter of $D_5$ smaller than the outer diameter of said seal fitting portion of said retainer and
  a second aperture portion with an inner diameter of $D_6$ smaller than the diameter $D_2$ of said cylindrical shank portion of said ball pin, and the inner diameter $D_6$ of the second aperture portion being 1/1.5 to 1/1.7 times smaller than the diameter $D_1$ of said spherical ball portion of said ball pin, wherein said first aperture portion of said joint seal member is for elastically fitting to said seal fitting portion of said retainer and for being held with the brim of said seal fitting portion of said retainer, and said second aperture portion of said joint seal member is for elastically fitting to said shank portion of said ball pin so that the joint section between said ball pin and said retainer is sealed with said joint seal member, said method comprising the steps of:
  fitting the first aperture portion of said joint seal member to the seal fitting portion of said retainer;
  applying lubricant to the entire second aperture portion of said joint seal member;
  arranging said ball pin and said retainer fitted with said joint seal member so as to direct the spherical ball portion of the ball pin toward the second aperture portion of said seal member and the opening portion of said retainer; and
  rapidly pressing at least one of said ball pin and said retainer toward the other at a predetermined relative speed higher than 20 cm/s, thereby inserting the spherical ball portion of said ball pin into the spherical hollow portion of said retainer through the second aperture portion of said joint seal member and the opening portion of said retainer, without using any opening tool for opening the second aperture portion of said joint seal member, and thereby fitting the second aperture portion of said joint seal member to the cylindrical shank portion of said ball pin.

2. A method for assembling a ball joint as set forth in claim 1, wherein said outer diameter of said cylindrical shank portion of the ball pin is 1.1 to 1.3 times larger than said inner diameter of said second aperture portion of the joint seal member.

3. A method for assembling a ball joint as set forth in claim 1, wherein said joint seal member is further provided with a barrel portion having a semicircularly curved section expanding outwardly on a side of said first aperture portion and a stepped portion continuous to said barrel portion on a side of said second aperture portion and having an S-shaped section.

4. A method for assembling a ball joint as set forth in claim 3, wherein said outer diameter of said cylindrical shank portion of the ball pin is 1.1 to 1.3 times larger than said inner diameter of said second aperture portion of the joint seal member.

5. A method for assembling a ball joint for use in a wiper link including a driving arm and a connecting rod for a motor vehicle windshield wiper,
said ball joint being composed of
a ball pin connected to the driving arm of said wiper link,
a retainer attached with the connecting rod of said wiper link, and
a joint seal member being of an elastic material and formed into a barrel shape, said ball pin being provided with
a spherical ball portion with an outer diameter of $D_1$ and
a cylindrical shank portion monolithic with the spherical ball portion and connected with the driving arm of said wiper link, said cylindrical shank portion having an outer diameter $D_2$ which is smaller than the outer diameter $D_1$ of the spherical ball portion,
said retainer being cap-shaped and having
an airtight spherical hollow portion with an inner diameter of $D_3$ slightly larger than the diameter $D_1$ of said spherical ball portion of said ball pin,
an opening portion being elastically deformable with an inner diameter of $D_4$ slightly smaller than the diameter $D_1$ of said spherical ball portion of said ball pin, and
a seal fitting portion with a brim portion surrounding the opening portion, and,
said joint seal member having
a first aperture portion with an inner diameter of $D_5$ smaller than the outer diameter of said seal fitting portion of said retainer, and
a second aperture portion with an inner diameter of $D_6$ smaller than the diameter $D_2$ of said shank portion of said ball pin and with an oil groove to be filled with grease, and the inner diameter $D_6$ of the second aperture portion being 1/1.5 to 1/1.7 times smaller than the diameter $D_1$ of said spherical ball portion of said ball pin,
wherein said first aperture portion of said joint seal member is for elastically fitting to said seal fitting portion of said retainer and for being held with the brim of said seal fitting portion of said retainer, and said second aperture portion of said joint seal member is for elastically fitting to said cylindrical shank portion of said ball pin so that the joint section between said ball pin and said retainer is sealed with said joint seal member,
said method comprising the steps of:
fitting the first aperture portion of said joint seal member to the seal fitting portion of said retainer using opening means for opening the first aperture portion;
applying lubricant to the entire second aperture portion of said joint seal member;
arranging said ball pin and said retainer fitted with said joint seal member so as to direct the spherical ball portion of said ball pin toward the second aperture portion of said seal member and the opening portion of said retainer; and
rapidly pressing at least one of said ball pin and said retainer toward the other at a predetermined relative speed higher than 20 cm/s, thereby inserting the spherical ball portion of said ball pin into the spherical hollow portion of said retainer through the second aperture portion of said joint seal member and the opening portion of said retainer, without using any opening tool for opening the second aperture portion of said joint seal member, and thereby fitting the second aperture portion of said joint seal member to the cylindrical shank portion of said ball pin.

6. A method for assembling a ball joint for use in a wiper link including a driving arm and a connecting rod for a motor vehicle windshield wiper,
said ball joint being composed of
a ball pin connected to the driving arm of said wiper link,
a retainer attached with the connecting rod of said wiper link, and
a joint seal member being of an elastic material and formed into a barrel shape, said ball pin being provided with
a spherical ball portion with an outer diameter of $D_1$ and
a cylindrical shank portion monolithic with the spherical ball portion and connected with the driving arm of said wiper link, said cylindrical shank portion having an outer diameter $D_2$ which is smaller than the outer diameter $D_1$ of the spherical ball portion,
said retainer being cap-shaped and having
an airtight spherical hollow portion with an inner diameter of $D_3$ slightly larger than the diameter $D_1$ of said spherical ball portion of said ball pin,
an opening portion being elastically deformable with an inner diameter of $D_4$ slightly smaller than the diameter $D_1$ of said spherical ball portion of said ball pin and
a seal fitting portion with a brim portion surrounding the opening portion, and,
said joint seal member having
a first aperture portion with an inner diameter of $D_5$ smaller than the outer diameter of said seal fitting portion of said retainer and
a second aperture portion with an inner diameter of $D_6$ smaller than the diameter $D_2$ of said cylindrical shank portion of said ball pin,
wherein said first aperture portion of said joint seal member is for elastically fitting to said seal fitting portion of said retainer and for being held with the brim of said seal fitting portion of said retainer, and said second aperture portion of said joint seal member is for elastically fitting to said shank portion of said ball pin so that the joint section between said ball pin and said retainer is sealed with said joint seal member, said method comprising the steps of:

applying lubricant to the entire second aperture portion of said joint seal member;

fitting the first aperture portion of said joint seal member to the seal fitting portion of said retainer;

arranging said ball pin and said retainer fitted with said joint seal member so as to direct the spherical ball portion of said ball pin toward the second aperture portion of said seal member and the opening portion of said retainer; and rapidly pressing at least one of said ball pin and said retainer toward the other at a predetermined relative speed higher than 20 cm/s thereby inserting the spherical ball portion of said ball pin into the spherical hollow portion of said retainer through the second aperture portion of said joint seal member and the opening portion of said retainer and positioning the spherical ball portion of said ball pin in the spherical hollow portion of said retainer, and thereby fitting the second aperture portion of said joint seal member to the cylindrical shank portion of said ball pin, without using any opening tool for opening the second aperture portion of said joint seal member.

* * * * *